US012801862B2

(12) United States Patent
Rossi et al.

(10) Patent No.: US 12,801,862 B2
(45) Date of Patent: Nov. 17, 2026

(54) GENERATION AND UTILIZATION OF UNIFIED FINE-TUNING DATASETS

(71) Applicant: Adobe Inc., San Jose, CA (US)

(72) Inventors: Ryan A. Rossi, Santa Clara, CA (US); Xiang Chen, Palo Alto, CA (US); Tong Yu, Fremont, CA (US); Sungchul Kim, San Jose, CA (US); Subrata Mitra, Bangalore (IN); Shunan Guo, San Jose, CA (US); Ryan Alexander Aponte, Pittsburgh, PA (US); Nedim Lipka, Campbell, CA (US); Franck Dernoncourt, Spokane, WA (US)

(73) Assignee: Adobe Inc., San Jose, CA (US)

( * ) Notice: Subject to any disclaimer, the term of this patent is extended or adjusted under 35 U.S.C. 154(b) by 83 days.

(21) Appl. No.: 18/429,996

(22) Filed: Feb. 1, 2024

(65) Prior Publication Data

US 2025/0252268 A1 Aug. 7, 2025

(51) Int. Cl.

| | |
|---|---|
| ***G06F 40/40*** | (2020.01) |
| ***G06F 16/3329*** | (2025.01) |
| ***G06N 3/0475*** | (2023.01) |
| ***G06N 3/0895*** | (2023.01) |

(52) U.S. Cl.

CPC ........... *G06F 40/40* (2020.01); *G06N 3/0895* (2023.01)

(58) Field of Classification Search

CPC ......... G10L 15/16; G10L 15/22; G06N 20/00; G06N 3/02

See application file for complete search history.

(56) References Cited

U.S. PATENT DOCUMENTS

| | | | | |
|---|---|---|---|---|
| 2017/0017899 | A1* | 1/2017 | Maor | G06F 16/285 |
| 2021/0350076 | A1* | 11/2021 | Kantor | G06N 20/00 |
| 2022/0188280 | A1* | 6/2022 | Bakhov | G06F 11/3079 |

(Continued)

OTHER PUBLICATIONS

Ouyang, Long, et al. "Training language models to follow instructions with human feedback." Advances in neural information processing systems 35 (2022): 27730-27744. (Year: 2022).*

(Continued)

*Primary Examiner* — Jialong He

(74) *Attorney, Agent, or Firm* — SHOOK, HARDY & BACON L.L.P.

(57) ABSTRACT

Methods and systems are provided for generating and using a unified fine-tuning dataset to fine-tune a language model. In embodiments described herein, a first labeled dataset having a first format of human feedback associated with performance of a pre-trained language model is accessed. Additionally, a second labeled dataset having a second format of human feedback associated with performance of the pre-trained language model is accessed. Thereafter, a unified fine-tuning dataset is generated by converting the second labeled dataset to a refined labeled dataset having the first format of human feedback and aggregating the first labeled dataset having the first format of human feedback with the refined labeled dataset having the first format of human feedback. The pre-trained language model is fine-tuned using the unified fine-tuning dataset and output for subsequent utilization.

17 Claims, 7 Drawing Sheets

(56) References Cited

U.S. PATENT DOCUMENTS

2025/0165861 A1* 5/2025 Qian .................... G06N 20/00

OTHER PUBLICATIONS

Heredia, Brian, et al. "Integrating multiple data sources to enhance sentiment prediction." 2016 IEEE 2nd international conference on collaboration and internet computing (CIC). IEEE, 2016. (Year: 2016).*

Aponte, Ryan, et al. "A Framework for Fine-Tuning LLMs using Heterogeneous Feedback." arXiv preprint arXiv:2408.02861 (2024). (Year: 2024).*

Zhang et al., "Multi-Agent Reinforcement Learning: A Selective Overview of Theories and Algorithms", Available online at: <https://arxiv.org/abs/1911.10635v2>, Version 2, 2021, pp. 1-73.

Zhao et al., "Gender Bias in Coreference Resolution: Evaluation and Debiasing Methods", Proceedings of the 2018 Conference of the North American Chapter of the Association for Computational Linguistics: Human Language Technologies, vol. 2 (Short Papers), 2018, pp. 15-20.

Štrupl et al., "Upside-Down Reinforcement Learning Can Diverge in Stochastic Environments with Episodic Resets", Available online at: <https://arxiv.org/abs/2205.06595>, 2022, pp. 1-9.

Akkaya et al., "Solving Rubik's Cube with A Robot Hand", Available online at: <https://arxiv.org/abs/1910.07113>, 2019, pp. 1-51.

Bai et al., "Training a Helpful and Harmless Assistant with Reinforcement Learning from Human Feedback", Available online at: <https://arxiv.org/abs/2204.05862>, 2022, pp. 1-72.

Beeching et al., "StackLLaMA: An RL Fine-tuned LLAMA Model for Stack Exchange Question and Answering", Available online at: <https://huggingface.co/blog/stackllama>, Apr. 5, 2023, pp. 1-20.

Berner et al., "Dota 2 with Large Scale Deep Reinforcement Learning", Available online at: <https://arxiv.org/abs/1912.06680>, Dec. 13, 2019, pp. 1-66.

Brandfonbrener et al. "When does return-conditioned supervised learning work for offline reinforcement learning?", Available online at: <https://arxiv.org/abs/2206.01079v3>, Version 3, 2023, pp. 1-21.

Brown et al., "Language Models are Few-Shot Learners", Available online at: <https://arxiv.org/abs/2005.14165>, Jul. 2020, pp. 1-75.

Chiang et al., "Vicuna: An Open-source Chatbot Impressing Gpt-4 with 90%* ChatGPT Quality", Available online at: <https://Imsys.org/blog/2023-03-30-vicuna/>, Mar. 2023, pp. 1-11.

Chowdhery et al., "Palm: Scaling language modeling with pathways", Available online at: <https://arxiv.org/abs/2204.02311>, 2022, pp. 1-87.

Christiano et al., "Deep Reinforcement Learning from Human Preferences", Available online at: <https://arxiv.org/abs/1706.03741v4>, Version 4, 2023, pp. 1-17.

Dettmers et al., "LLM.int8(): 8-bit Matrix Multiplication for Transformers at Scale", Available online at: <https://arxiv.org/abs/2208.07339v2>, Version 2, 2022, pp. 1-20.

Dettmers et al., "QLoRA: Efficient Finetuning of Quantized LLMs", Available online at: <https://arxiv.org/abs/2305.14314>, 2023, pp. 1-26.

Diao et al., "Active Prompting with Chain-of-Thought for Large Language Models", Available online at: <https://arxiv.org/abs/2302.12246>, 2023, pp. 1-20.

Ethayarajh et al., "Stanford Human Preferences Dataset", Available online at: <https://huggingface.co/datasets/stanfordnlp/SHP>, 2023, pp. 1-13.

Geng et al., "Koala: A Dialogue Model for Academic Research", Available online at : <https://bair.berkeley.edu/blog/2023/04/03/koala/>, Apr. 3, 2023, pp. 1-8.

Glaese et al., "Improving alignment of dialogue agents via targeted human judgements", Available online at: <https://arxiv.org/abs/2209.14375>, Sep. 2022, pp. 1-77.

Grießhaber et al., "Fine-tuning BERT for Low-Resource Natural Language Understanding via Active Learning", Proceedings of the 28th International Conference on Computational Linguistics, Dec. 2020, pp. 1158-1171.

Hanu et al., "Detoxify", Available online at: <https://github.com/unitaryai/detoxify>, 2020, pp. 1-7.

Hu et al., "LoRA: Low-Rank Adaptation of Large Language Models", Available online at: <https://arxiv.org/abs/2106.09685v2>, Version 2, 2021, pp. 1-26.

Kaelbling et al., "Reinforcement Learning: A Survey", Journal of Artifcial Intelligence Research, vol. 4, May 1996, pp. 237-238.

Kojima et al., "Large Language Models are Zero-Shot Reasoners", Available online at: <https://arxiv.org/abs/2205.11916v4>, Version 4, 2023, pp. 1-42.

Köpf et al., "OpenAssistant Conversations—Democratizing Large Language Model Alignment", Available online at: <https://arxiv.org/abs/2304.07327v2>, Version 2, 2023, pp. 1-34.

Kumar et al., "Reward-Conditioned Policies", Available online at: <https://arxiv.org/abs/1912.13465>, 2019, pp. 1-13.

Levesque et al., "The Winograd Schema Challenge", Proceedings of the Thirteenth International Conference on Principles of Knowledge Representation and Reasoning, 2012, pp. 1-10.

Marasovic' et al., "Few-Shot Self-Rationalization with Natural Language Prompts", Findings of the Association for Computational Linguistics: NAACL 2022, Jul. 2022, pp. 410-424.

Margatina et al., "On the Importance of Effectively Adapting Pretrained Language Models for Active Learning", Proceedings of the 60th Annual Meeting of the Association for Computational Linguistics (vol. 2: Short Papers), 2022, pp. 825-836.

Nakano et al., "WebGPT: Browser-assisted question-answering with human feedback", Available online at: <https://arxiv.org/abs/2112.09332>, 2021, pp. 1-30.

Nye et al., "Show Your Work: Scratchpads for Intermediate Computation with Language Models", Available online at: <https://arxiv.org/abs/2112.00114>, 2021, pp. 1-16.

Ouyang et al., "Training Language Models to Follow Instructions with Human Feedback", Available online at: <https://arxiv.org/abs/2203.02155>, 2022, pp. 1-68.

Paranjape et al., "Art: Automatic Multi-step Reasoning and Tool-use for Large Language Models", Available online at: <https://arxiv.org/abs/2303.09014v1>, 2023, pp. 1-26.

Paul et al., "Deep Learning on a Data Diet: Finding Important Examples Early in Training", Advances in Neural Information Processing Systems, vol. 34, 2021, pp. 20596-20607.

Sakaguchi et al., "WINOGRANDE: An Adversarial Winograd Schema Challenge at Scale", Available online at: <https://arxiv.org/abs/1907.10641>, 2019, pp. 1-9.

Schmidhuber, J., "Reinforcement Learning Upside Down: Don't Predict Rewards—Just Map Them to Actions", Available online at: <https://arxiv.org/abs/1912.02875v2>, Version 2, 2020, pp. 1-22.

Schulman et al., "Proximal Policy Optimization Algorithms", Available online at: < arXivpreprintarXiv:1707.06347>, 2017, pp. 1-12.

Shen et al., "Deep Active Learning for Named Entity Recognition", Available online at: <https://arxiv.org/abs/1707.05928v3>, Version 3, 2018, pp. 1-15.

Silver et al., "A General Reinforcement Learning Algorithm that Masters Chess, Shogi, and Go Through Self-play", Science, vol. 362, No. 6419, Dec. 7, 2018, pp. 1140-1144.

Silver et al., "Mastering the Game of Go with Deep Neural Networks and Tree Search", Nature, vol. 529, No. 7587, Jan. 2016, pp. 484-489.

Srivastava et al., "Training Agents using Upside-Down Reinforcement Learning", Available online at: <https://arxiv.org/abs/1912.02877v2>, Version 2, 2021, pp. 1-31.

Stiennon et al., "Learning to summarize from human feedback", Available online at: <https://arxiv.org/abs/2009.01325v3>, Version 3, 2022, pp. 1-45.

Syed et al., "Active learning for low-resource speech recognition: Impact of selection size and language modeling data," 2017 IEEE International Conference on Acoustics, Speech and Signal Processing (ICASSP), 2017, pp. 5315-5319.

(56) References Cited

OTHER PUBLICATIONS

Taori et al., “Stanford Alpaca: An Instruction-following LLAMA Model”, Available online at: <https://github.com/tatsu-lab/stanford_alpaca>, 2023, pp. 1-7.
Toneva et al., “An Empirical Study of Example Forgetting during Deep Neural Network Learning”, ICLR, 2019, pp. 1-18.
Watkins, C. J. C. H., “Learning from Delayed Rewards”, PhD thesis, Available online at: <https://www.researchgate.net/publication/33784417_Learning_From_Delayed_Rewards>, May 1989, pp. 1-241.
Wei et al., “Chain-of-Thought Prompting Elicits Reasoning in Large Language Models”, Available online at: <https://arxiv.org/abs/2201.11903v6>, Version 6, 2023, pp. 1-43.
Wolf et al., “HuggingFace's Transformers: State-of-the-art Natural Language Processing”, Available online at: <https://arxiv.org/abs/1910.03771v5>, Version 5, 2020, pp. 1-8.
Yang et al., “Dichotomy of Control: Separating What You Can Control from What You Cannot”, Available online at: <https://arxiv.org/abs/2210.13435>, 2022, pp. 1-19.
Yao et al., “ZeroQuant-V2: Exploring Post-training Quantization in LLMs from Comprehensive Study to Low Rank Compensation”, Available online at: <https://arxiv.org/abs/2303.08302>, 2023, pp. 1-24.
Yu et al., “The Surprising Effectiveness of PPO in Cooperative Multi-Agent Games ”, Advances in Neural Information Processing Systems, vol. 35, 2022, pp. 24611-24624.
Zhang et al., “Alphazero”, Deep Reinforcement Learning: Fundamentals, Research and Applications, 2020, pp. 391-415.
Zhang et al., “Automatic Chain of Thought Prompting in Large Language Models”, Available online at: <https://arxiv.org/abs/2210.03493>, 2022, pp. 1-25.

* cited by examiner

GENERATION AND UTILIZATION OF UNIFIED FINE-TUNING DATASETS

BACKGROUND

Fine-tuning a language model includes training a pre-trained language model on a smaller dataset that is specific to a task to provide a more accurate model tailored to particular needs. Oftentimes, a pre-trained language model is fine-tuned using a dataset of human-labeled data for a specific task or domain. Accordingly, such fine-tuning requires human annotation. As human annotations and labeling can be provided in different formats, fine-tuning datasets including human feedback or annotations can be incompatible with one another due to different formats of supervisions. For example, one labeled dataset may include human feedback in a binary format that indicates a preference of one response over another response to a prompt, while another labeled dataset may include human feedback in a numerical format that indicates an extent of interest or preference of a response to a prompt.

SUMMARY

Various aspects of the technology described herein are generally directed to systems, methods, and computer storage media for, among other things, generation of a unified fine-tuning dataset and utilization of the unified-fine tuning dataset for effective and efficient fine-tuning of a language model. A unified fine-tuning dataset generally refers to a fine-tuning dataset that includes a unified or homogeneous format of feedback data (e.g., provided by a human feedback provider). In this regard, datasets of various formats of feedback data can be converted to a target feedback format to generate a unified fine-tuning dataset. In some cases, a data filter can be applied to reduce the data used for fine-tuning. For example, the unified fine-tuning dataset can be analyzed to remove one or more samples in a dataset that are identified as low-quality examples or redundant examples. Such a unified fine-tuning dataset can then be used to fine-tune a language model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
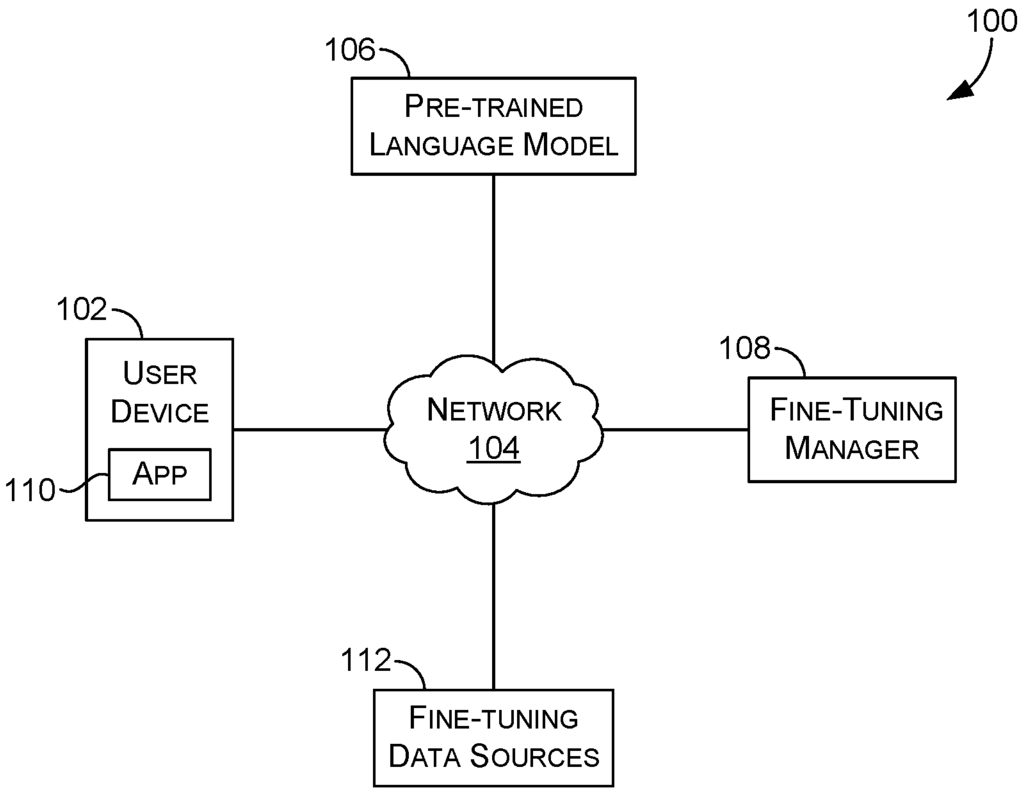
FIG. 1 depicts a diagram of an environment in which one or more embodiments of the present disclosure can be practiced, in accordance with various embodiments of the present disclosure.

Fine-tuning a language model, such as a large language model (LLM), refers to the process of retraining a pre-trained model on a specific dataset(s). In this regard, a pre-trained model is trained on a smaller dataset that is specific to a task, thereby providing a more accurate model tailored to particular needs. Fine-tuning a language model enables the model to perform various tasks with higher accuracy. Oftentimes, a pre-trained language model is fine-tuned using a dataset of labeled data for a specific task or domain. As one example, supervised fine-tuning (SFT) adapts a pre-trained language model to a specific task or domain using labeled data. As another example, SFT can be combined with reinforcement learning from human feedback (RLHF) to perform fine-tuning of a language model. RLHF has been applied to a wide range of tasks, including games, text summarization, web navigation, and chat bots.

Although such fine-tuning implementations mitigate limitations of pre-trained language models (e.g., LLMs), such implementations require human annotation, which can result in different types of supervisions or feedback. Accordingly, datasets including human feedback or annotations may be incompatible with one another due to different formats of supervisions, from binary preference and numerical preference to multi-dimensional preference.

Further, when multiple datasets are used, the number of fine-tuning examples can increase beyond what is necessary to perform effective fine-tuning. Using an excessive number of fine-tuning examples may hinder performance and result in unnecessary utilization of computing resources.

Accordingly, embodiments described herein are directed to generation of a unified fine-tuning dataset and utilization of the unified-fine tuning dataset for effective and efficient fine-tuning of a language model. A unified fine-tuning dataset generally refers to a fine-tuning dataset that includes a unified or homogeneous format of feedback data (e.g., provided by a human feedback provider). In this regard, datasets of various formats of feedback data can be converted to a target feedback format to generate a unified fine-tuning dataset. In some cases, a data filter can be applied to reduce the data used for fine-tuning. For example, the unified fine-tuning dataset can be analyzed to remove one or more samples in a dataset that are identified as low-quality examples or redundant examples. Such a unified fine-tuning dataset can then be used to fine-tune a language model. In embodiments, a language model is a large language model (LLM) that is fine-tuned.

In operation, and at a high level, embodiments described herein combine data into a single feedback format type (e.g., binary preference), upon which fine-tuning implementations, such as SFT methods and RLHF techniques, can be applied. By way of example, a numerical feedback format and a multi-axis numerical feedback format may be converted to a binary feedback format, enabling the use of standard fine-tuning methods across the diverse or heterogeneous format types. Further, in embodiments, a data filtering analysis can be applied to select high-quality and diverse data from a given dataset (e.g., numerical or ordinal supervision). The quality and diversity of data can be estimated in any of a number of ways. In some cases, feedback may be used to assess quality. For instance, two similar responses, based on a similar numerical supervision score, may indicate low quality. For example, consider responses A and B. If A, the preferred response, has a measure of 0.8, and B has a measure of 0.6, response A is better by the metric. However, if a response C exists, with a measure of 0.4, the gap in preference between A and the alternative response C has doubled. Using responses A and C, therefore, may be more useful in fine-tuning due to the larger gap in preference. Additionally, diversity can be identified using standard clustering algorithms, including k-Means.

Advantageously, generating a unified fine-tuning dataset enables fine-tuning of a language model using diverse datasets, regardless of supervision type, thereby enabling a more precise type of fine-tuning. In this regard, accepting multiple types of supervision enables fine-tuning using a wider variety of datasets and human preferences. Fine-tuning in accordance with multiple types of preferences enables language models to more precisely learn human preferences. Additionally, by using datasets of different feedback formats, larger quantities of fine-tuning data are available for simultaneous use in fine-tuning. Availability of fine-tuning data is advantageous given the oftentimes limited availability of datasets due to necessary human annotations or labeling.

Further, implementing embodiments described herein enables a more efficient use of computing resources. In particular, computing resources utilization is reduced by generating a unified fine-tuning dataset and filtering such a dataset to more efficiently and effectively use the dataset to fine-tuning a language model. As one example, in conventional implementations, multiple types of supervision can require multiple iterations of fine-tuning a language model, thereby using unnecessary computing resources. For instance, with a RLHF implementation, a first reward model can be fine-tuned using data with scalar feedback. A fine-tuning dataset with binary preference supervision can require training a second reward model. Such a process of serial fine-tuning can be computationally expensive as well as prone to error. As another example, embodiments described herein filter or select high-quality and diverse samples from a dataset(s), thereby reducing the number of samples used to fine-tune a language model. Using a reduced number of samples to fine-tune a language model results in less computer resources used for fine-tuning. Moreover, using more important examples for fine-tuning can obtain a higher performance than using the full fine-tuning dataset.

Although embodiments are generally described herein in relation to fine-tuning language models, such as large language models, such implementations can be performed in association with any type of machine learning model that can be fine-tuned.

Various terms are used throughout the description of embodiments provided herein. A brief overview of such terms and phrases is provided here for ease of understanding, but more details of these terms and phrases are provided throughout.

A language model generally refers to an artificial intelligence (AI) system trained to understand and generate human-readable text. A pre-trained language model refers to a language model that is trained on a large and diverse dataset to learn general language patterns and contexts. Examples of pre-trained language models include Generative-Pre-trained Transformer (GPT) models, text-to-text transfer transformer (T5) models, Bidirectional Encoder Representations from Transformers ("BERT") models, such as sentence-BERT (SBERT) models, robustly optimized BERT approach (ROBERTa) models, and/or the like, Fine-tuned Language Net (FLAN) models, such as FLAN-T5 and/or the like, Pathways Language Model (PaLM), XLNet and/or the like.

Fine-tuning refers to the process of adjusting a pre-trained language model based on specific data to improve the performance of the model for a specific task, domain, and/or application related to the specific data.

A prompt for a language model refers to a specific input or instruction given to the language model to generate a desired response. For example, a prompt can include a query, such as a question for the language model to answer, context for the query, such as a source of information where the answer can be determined from, and/or additional instructions for the language model, such as instructions to provide the answer in a specific format. Context for the prompt refers to the information that precedes and/or is provided with the prompt that helps guide the language model's understanding in providing a response.

A unified fine-tuning dataset refers to a dataset used for fine-tuning that includes a unified or single format of feedback data. A feedback data format refers to a type of feedback data, such as, for example, binary preference feedback, numerical feedback, multi-axis numerical feedback.

Overview of Exemplary Environments of Facilitating Generation and Utilization of Unified Fine-Tuning Datasets Turning to the figures, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, application 110, network 104, pre-trained language model 106, and a fine-tuning manager 108. Operating environment 100 also shows fine-tuning data sources 112 that provide or store various data, for example, to be used to generate a unified fine-tuning dataset. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual or entity interested in fine-tuning a language model. For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice.

Application 110 operating on user device 102 can generally be any application capable of facilitating the fine-tuning of a pre-trained language model 106 by fine-tuning manager 108. In embodiments, the application 110 may be used to initiate fine-tuning of a pre-trained language model 106. For instance, an individual or entity may select, via application 110, to initiate fine-tuning of a pre-trained language model 106. In some cases, the user may select the pre-trained language model 106 to fine-tune and/or select the dataset(s) to use in performing fine-tuning. For instance, the application 110 may present a user interface that enables an individual to select to fine-tune the pre-trained language model 106 as well as multiple datasets to use for fine-tuning, and any other preferences associated therewith. In some implementations, the application 110 comprises a web application, which can run in a web browser, and could be hosted at least partially server-side (e.g., via fine-tuning manager 108). In addition, or instead, the application 110 can comprise a dedicated application. In some cases, the application 110 is integrated into the operating system (e.g., as a service). It is therefore contemplated herein that "application" be interpreted broadly.

User device 102 can be a client device on a client-side of operating environment 100, while pre-trained language model 106 and/or fine-tuning manager 108 can be on a server-side of operating environment 100. Pre-trained language model 106 and/or fine-tuning manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or fine-tuning manager 108 to remain as separate entities.

At a high level, the fine-tuning manager 108 performs various functionalities to facilitate efficient and effective fine-tuning of a language model and/or use of a fine-tuned language model. The fine-tuning manager 108 and/or pre-trained language model 106 can communicate with application 110 in order for application 110 to display input/output to and/or from language models via a display screen of the user device 102. In this regard, fine-tuning manager 108 can communicate with pre-trained language model 106 in order to fine-tune pre-trained language model 106 (e.g., to generate fine-tuned language model 240 of FIG. 2).

In operation, pre-trained language model 106 (e.g., pre-trained language model 206 of FIG. 2) is fine-tuned by fine-tuning manager 108 using a unified fine-tuning dataset. The fine-tuning manager 108 generates the unified fine-tuning dataset from multiple datasets having different formats or types of feedback data. In this regard, a first dataset may have feedback data of a first format, and a second dataset may have feedback of a second format. To generate a unified fine-tuning dataset, the second dataset having feedback of a second format may be converted to a dataset having feedback of the first format. Data may be filtered or selected to include quality and diverse data so that such data is used to perform fine-tuning of the pre-trained language model 106. In this regard, pre-trained language model 106 (e.g., the corresponding embeddings/parameters of the pre-trained language model) is accessed. For example, pre-trained language model 106 can be pre-trained on a large and diverse dataset to learn general language patterns and contexts so that the language model can be utilized to generate output responses in response to input prompts. The pre-trained language model 106 can then be fine-tuned by fine-tuning manager 108 to produce desired or optimal responses.

In some embodiments, the heterogeneous datasets (e.g., labeled datasets 210 of FIG. 2) used to generate the unified fine-tuning dataset may be obtained from fine-tuning data sources 112. A dataset may include a prompt, a response(s), and a feedback associated therewith. In some cases, the dataset(s) obtained from fine-tuning data sources, or other data store or source, may be in the form of a table or graph.

In some embodiments, the pre-trained language model 106 (e.g., or each of the pre-trained language models) is fine-tuned via a SFT implementation and/or an RLFHF implementation.

Figure 2:
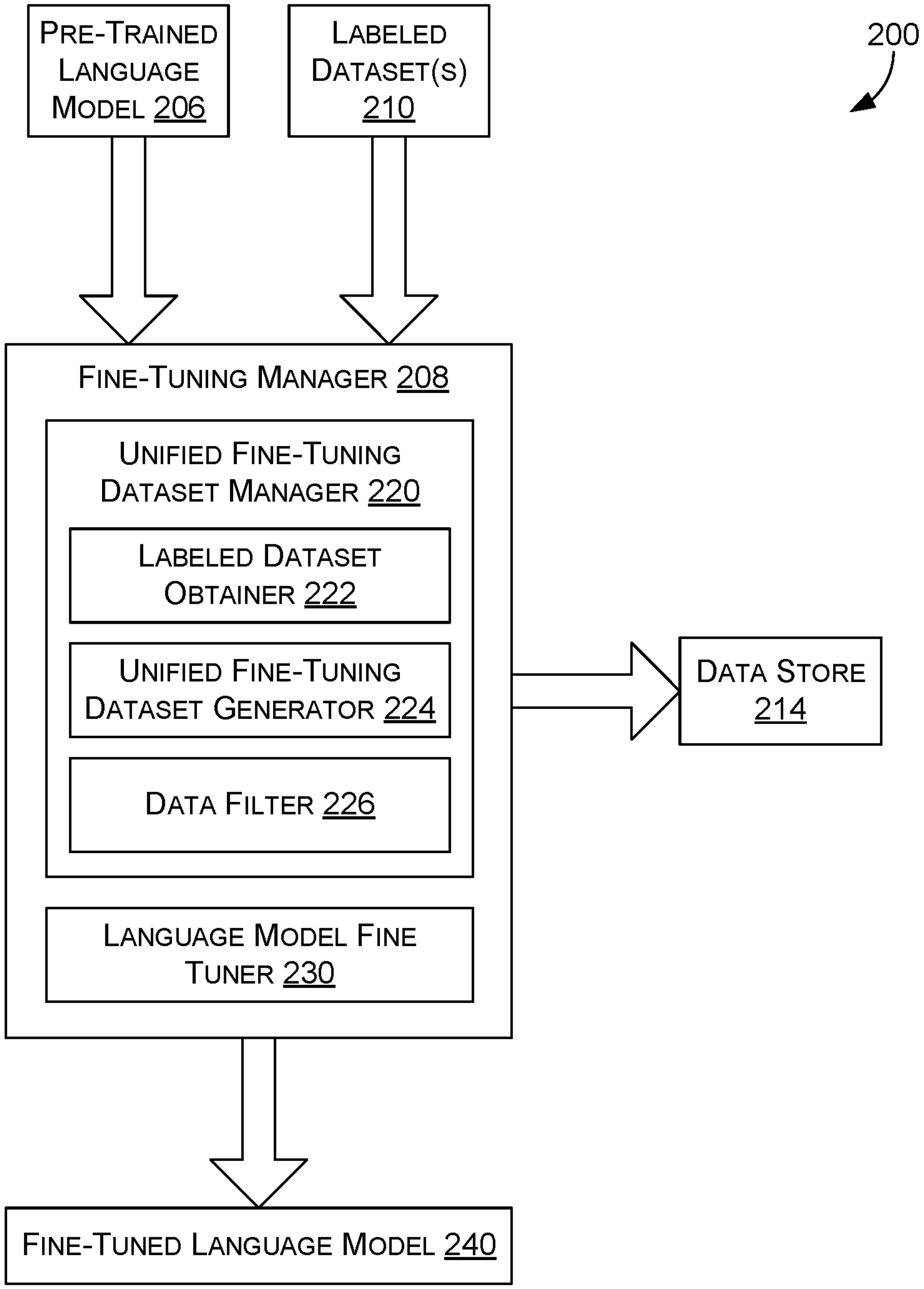
FIG. 2 depicts an example configuration of an operating environment in which some implementations of the present disclosure can be employed, in accordance with various embodiments of the present disclosure.

The fine-tuned language model(s) (e.g., the corresponding embeddings/parameters of the fine-tuned language model(s)) is output by the fine-tuning manager 108 and stored (e.g., in data store 214 of FIG. 2). In this regard, the fine-tuned language model can be used to provide accurate and relevant responses to prompts. For example, an individual may provide a prompt, which can be input to the fine-tuned language model, and based on the prompt, a response can be generated and provided as output. Such a prompt may be input via a user device, such as user device 102. As can be appreciated, an individual may operate a different user device to provide a prompt than a user device uses to initiate fine-tuning of a language model. For example, one user device may be used by an analyst to initiate fine-tuning of a language model, while another user device may be used to utilize a fine-tuned language model (e.g., by entering a prompt and viewing a response generated by the fine-tuned language model).

Fine-tuning manager 108 and pre-trained language model 106 can each be or include a server, including one or more processors and one or more computer-readable media. The computer-readable media includes computer-readable instructions executable by the one or more processors. The instructions can optionally implement one or more components of fine-tuning manager 108 and pre-trained language model 106, described in additional detail below with respect to fine-tuning manager 208 of FIG. 2.

For cloud-based implementations, the instructions on fine-tuning manager 108 and pre-trained language model 106 can implement one or more components, and application 110 can be utilized by a user to interface with the functionality implemented on fine-tuning manager 108 and pre-trained language model 106. In some cases, application 110 comprises a web browser. In other cases, fine-tuning manager 108 and/or pre-trained language model 106 may not be required. For example, the components of fine-tuning manager 108 and/or pre-trained language model 106 may be implemented completely on a user device, such as user device 102. In this case, fine-tuning manager 108 and/or pre-trained language model 106 may be embodied at least partially by the instructions corresponding to application 110.

Thus, it should be appreciated that fine-tuning manager 108 and pre-trained language model 106 may be provided via multiple devices arranged in a distributed environment that collectively provide the functionality described herein. Additionally, other components not shown may also be included within the distributed environment. In addition, or instead, fine-tuning manager 108 and/or pre-trained language model 106 can be integrated, at least partially, into a user device, such as user device 102. Furthermore, fine-tuning manager 108 and/or pre-trained language model 106 may at least partially be embodied as a cloud computing service.

Referring to FIG. 2, aspects of an illustrative unified dataset management system 200 are shown, in accordance with various embodiments of the present disclosure. At a high level, the unified dataset management system 200 facilitates efficient and effective generation of a unified fine-tuning dataset and utilization of the unified fine-tuning dataset for fine-tuning of a language model. The unified dataset management system 200 operates using fine-tuning manager 208. As described herein, the fine-tuning manager 208 includes a unified fine-tuning dataset manager 220 and a language model fine tuner 230. Any number or combination of components can be used to employ functionality described herein in relation to the fine-tuning manager and need not be limited herein.

In operation, the unified fine-tuning dataset manager 220 is generally configured to manage generation of a unified fine-tuning dataset. Thereafter, the language model fine tuner 230 is generally configured to fine-tune a language model, such as pre-trained language model 206, to produce fine-tuned language model 240.

The unified fine-tuning dataset manager 220 may include any number of components to perform functionalities described herein. In one embodiment, the unified fine-tuning dataset manager 220 includes a labeled dataset obtainer 222, a unified fine-tuning dataset generator 224, and a data filter 226. Such components can operate to generate a unified fine-tuning dataset, which can thereafter be used by the language model fine tuner 230 to fine-tune a language model.

The labeled dataset obtainer 222 is generally configured to obtain labeled datasets that may be used for fine-tuning a language model. In this regard, the labeled dataset obtainer 222 obtains various labeled datasets 210. A labeled dataset generally refers to a dataset that includes a set or compilation of prompts and corresponding responses as well as feedback data associated therewith. A prompt generally refers to a specific input or instruction for inputting into a language model to generate a desired response. For example, a prompt can include a query, such as a question for the language model to answer; context for the query, such as a source of information where the answer can be determined from; and/or additional instructions for the language model, such as instructions to provide the answer in a specific format. A prompt may include text that is input to a language model or that may be input into a language model.

A response generally refers to a sequence of text generated, or that can be generated, by a language model given a prompt. A response(s) for which feedback data is obtained can be a response generated by a language model. In this regard, in some cases, a response(s) generated by a language model in association with a prompt may be presented to a feedback provider (e.g., via a user interface), and the feedback provider may provide feedback related to the response (s) relative to a particular prompt. Additionally or alternatively, a response(s) for which feedback is obtained may be a potential response that may be generated by a language model in association with a prompt. In this regard, a potential response can be presented to a feedback provider (e.g., via a user interface), and the feedback provider can provide feedback related to the response(s) relative to the prompt.

Feedback data generally refers to data provided as feedback in relation to a response(s) to a prompt. In this regard, feedback data can be obtained in accordance with a prompt-response(s) sample. The prompt may correspond with a single response or multiple responses (e.g., two responses). Feedback data may take any number of forms, including numerals, text, scores, rankings, etc.

A feedback provider generally refers to a human that provides feedback in relation to a response(s). In some cases, the feedback provider may be a human that inputs prompts to a language model in an effort to obtain information via a response(s) and, thereafter, provides feedback relative to the response(s). In other cases, the feedback provider may be a human evaluator or annotation that is intending to provide feedback relative to responses, or candidate responses, to use in fine-tuning a language model. In this way, a set of prompts and corresponding responses (prompt-response samples) may be provided to the feedback provider for evaluating and annotating the responses or prompt-response(s) samples (e.g., ranking, scoring, or otherwise providing feedback relative to the responses). For instance, following an initial model training, a human tester or annotator contribute their evaluations of the model's performance. Such human feedback can include assignment of quality, preference, or accuracy ratings to different outputs generated by the model. Although feedback data is generally described herein as being provided by a feedback provider, in some cases, feedback data may be automatically generated and provided (e.g., generated by a large language model).

Feedback data may be obtained in various formats as various types of feedback data. By way of example, and without limitation, feedback data may be in a binary format, a numerical format, a multi-axis numerical format, etc. In a binary format, feedback indicates a preference of a response over another response. For example, given two text responses to a prompt, feedback data may indicate a preference for one of the text responses. In some cases, a binary format may represent indications of preference using a 0 or 1 (e.g., 1 indicating the preferred response). In other cases, a binary format may represent indications of preference using a 1 or 2 (e.g., 1 represents the first response and 2 represents the second response). A numerical format generally refers to a numerical indicator of an extent of preference. To indicate an extent of preference, a numerical indicator may be a numeral among a range of values. For example, a value between 0 and 1 may be provided to indicate an extent of preference in relation to a response to a prompt. For instance, for a first response, a numerical indicator of 0.7 may be provided by a feedback provider, and for a second response (e.g., associated with a same prompt as the first prompt), a numerical indicator of 0.5 may be provided by a feedback provider. For a multi-axis numerical format, multiple numerical indicators may be provided for a response associated with a prompt. For example, for a particular response, a first numerical indicator may be provided in association with a first attribute (e.g., gender bias), and a second numerical indicator may be provided in association with a second attribute (e.g., response length). Any number or type of attributes may be used to obtain feedback (e.g., for the numerical feedback or the multi-axis numerical feedback). By way of example only, and not limitation, examples of attributes for which feedback may be obtained include completeness, consistency, novelty, simplicity, fairness, clarity, accuracy, bias, relevance, diversity, transparency, personalization, efficiency, spam, etc.

In accordance with embodiments described herein, the labeled dataset obtainer 222 may obtain heterogeneous datasets. Heterogeneous datasets refer to datasets with variability of data types and/or formats. In particular, heterogeneous datasets can include datasets with different types of feedback formats. In this regard, the labeled dataset obtainer 220 may obtain one dataset having a first type of feedback format (e.g., a binary format) and another dataset having a second type of feedback format (e.g., a numerical format).

In some embodiments, the various datasets (e.g., heterogeneous datasets) may be obtained from a data store, such as data store 214. Such a data store 214 may obtain labeled datasets from any number of sources. In other embodiments, the various datasets may be obtained from any number of data sources, such as Internet sources or third-party data sources that generate or acquire feedback data in relation to prompt-response samples.

In some cases, labeled datasets may be obtained in accordance with an expiration of a time duration. For example, labeled datasets may be obtained from any number of sources every 24 hours. In other cases, labeled datasets may be obtained in accordance with a user selection, for example, to fine-tune a language model. For instance, an entity associated with fine-tuning a language model may input a selection to initiate language model fine-tuning, thereby initiating obtaining labeled datasets. The labeled datasets obtained to analyze for fine-tuning may be all labeled datasets or a portion of labeled datasets (e.g., updated labeled datasets, or portions thereof, or new labeled datasets, or portions thereof, relative to a prior language model fine-tuning).

The labeled datasets data may be arranged in various formats. As one example, the obtained labeled datasets may be arranged in a table or chart format. For instance, a first column may include an indication of a prompt, a set of columns may include an indication of one or more responses, and a final column may include feedback data. In other examples, the obtained labeled datasets may be arranged as a listing or set of tuples. For example, a tuple may be structured in a prompt-response-label tuple format.

The unified fine-tuning dataset generator 224 is generally configured to generate a unified fine-tuning dataset. In this way, the unified fine-tuning dataset generator 224 generates a fine-tuning dataset that is unified or homogenous in the format of the feedback data. As described, a fine-tuning dataset refers to a dataset used to fine-tune a language model. In accordance with embodiments described herein, the fine-tuning dataset includes various prompt-response(s) samples and corresponding feedback data. The prompt-response(s) sample refers to a prompt and a corresponding response(s) (e.g., generated by a language model). As can be appreciated, in some cases, a prompt-response sample may include a single response. In other cases, a prompt-response sample may include multiple responses (e.g., two responses associated with the prompt).

In some embodiments, the unified fine-tuning dataset generator 224 may determine or select a target feedback format for use in the unified fine-tuning dataset. A target feedback format refers to a format or feedback type desired to be used for the unified fine-tuning dataset. In some cases, a target feedback format may be indicated or selected by a user, such as an initiator of a language model fine-tuning. For instance, a default or preset target feedback format may be provided. In other cases, a target feedback format may be selected via a user interface for use in fine-tuning a language model. In other cases, a target feedback format may be automatically determined, for example, based on a dataset. For instance, as one example, given a first labeled dataset having a binary feedback, a second labeled dataset having a numerical feedback, and third labeled dataset having a multi-axis numerical feedback, the unified fine-tuning dataset generator 224 may select a most basic or general feedback format as a target feedback format. As such, in this example, the binary feedback may be selected.

In accordance with selecting or identifying a target feedback format, the unified fine-tuning dataset generator 224 converts labeled datasets to the target feedback format. In this regard, labeled datasets having feedback in a format different from the target feedback format can be identified and converted to the target feedback format. Converting a labeled dataset to a target feedback format can occur in any number of ways and generally depends on the target feedback format as well as the feedback format of the labeled dataset. Examples of converting a labeled dataset to a target feedback format are provided herein for illustrative purposes only, and the manner in which labeled datasets are converted to a target feedback format are not intended to be limited herein. As can be appreciated, any conversion from one feedback format to another feedback format may be implemented and are contemplated in accordance with embodiments described herein.

To provide an illustrative example, assume binary feedback is selected as the target feedback format (e.g., based on system instructions, user preference, etc.). In such a case, labeled datasets having non-binary feedback are identified and converted to a binary feedback format for use in generating a unified fine-tuning dataset. The various non-binary feedback formats can be converted to a binary feedback format in any number of ways, which may be configured in implementation.

Continuing with the example, assume a labeled dataset includes a numerical feedback format that is to be converted to a binary feedback format. Further assume a prompt corresponds with two different responses for which feedback data may be between 0 and 1. In this regard, feedback data may be obtained in association with a first prompt-response sample and a second prompt-response sample. Now assume the feedback data associated with the first prompt-response sample indicates an interest of 0.7, and the feedback data associated with the second prompt-response sample indicates an interest of 0.5. In such a case, an interest in the first prompt-response sample indicating a higher interest may be selected as the sample of interest and indicated as such via a binary feedback. For instance, the first prompt-response sample may be indicated as the preferred response over the second prompt-response sample in a similar manner as that of the obtained binary feedback.

Now assume a multi-axis numerical feedback format is to be converted to a binary feedback format. Further assume a prompt corresponds with two different responses for which feedback data may be between 0 and 1 for each attribute. In this regard, feedback data for multiple attributes is obtained in association with a first prompt-response sample and for multiple attributes associated with a second prompt-response sample. Examples of attributes may be, for instance, gender bias, response length, etc. Assume the feedback data for the first prompt-response sample is 0.3 for a first attribute and 0.5 for a second attribute, and the feedback data for the second prompt-response sample is 0.6 for the first attribute and 0.4 for the second attribute. To convert such data to a binary format, a preferred sample may be identified and indicated as such via a binary feedback indicator. For instance, the first prompt-response sample may be indicated as the preferred response over the second prompt-response sample in a similar manner as that of the obtained binary feedback.

Identifying a preferred sample when multiple numerical values exist corresponding with different attributes may occur in any number of ways. As one example, an average of the different numerical values may be determined in association with each sample. For instance, for the first prompt-response sample, the average of 0.4 may be determined between the two attributes, and for the second prompt-response sample, the average of 0.5 may be determined between the two attributes. In this way, the second prompt-response sample may be identified as the preferred sample. As another example, a numerical value associated with a particular attribute type may be used to identify a preferred sample. For instance, in cases in which the first attribute type is selected, the second prompt-response sample having a value of 0.6 is selected as the preferred sample over the first prompt-response sample having a value of 0.3. The particular attribute type of interest may be selected or identified in any number of ways, such as, for example, a default attribute type or user-selected attribute type. As one example, fine-tuning a language model in a manner that avoids gender bias may result in selection of a numerical value reflecting gender bias as the selected attribute type used to identify a preferred sample.

As can be appreciated, in some cases, a prompt may correspond with more than two different responses. For example, a prompt may have a first response, a second response, and a third response. Various implementations may be employed to generate a binary format that indicates a preference between two responses. As one example, different combinations of responses may be generated in association with a prompt. For example, the first and second responses may be compared in association with the prompt, the second and third responses may be compared in association with the prompt, and the first and third responses may be compared in association with the prompt.

As another example, two of the responses may be selected for comparing to one another in association with a prompt. Selecting the two responses may be performed in various ways. As one example, two responses may be randomly selected. As another example, two responses may be selected based on the feedback associated therewith. For example, assume a first response corresponds with feedback of 0.7, a second response corresponds with feedback of 0.5, and a third response corresponds with feedback of 0.3. In such a case, the numerical values of 0.7, 0.5, and 0.3 may be used to select two of the responses. In one implementation, the most varied numerical indicators may be selected. In this example, the first response corresponding with the feedback of 0.7 and the third response corresponding with the feedback of 0.3 may be selected for comparing to one another in association with a prompt in order to generate a binary dataset.

As can be appreciated, conversions to different target feedback format may occur. For example, a target feedback format may be a numerical feedback format. In such a case, binary feedback and/or multi-axis numerical feedback, among other feedback formats, may be converted to a numerical feedback format. As another example, a target feedback format may be a multi-axis numerical feedback. In such a case, binary feedback and/or numerical feedback, among other feedback formats, may be converted to a multi-axis numerical feedback format.

In accordance with converting one or more labeled datasets having a non-target feedback format (which may also be referred to herein as a second feedback format) to a target feedback format (which may also be referred to herein as a primary feedback format), the unified fine-tuning dataset generator 224 can aggregate or join the various data to generate a unified fine-tuning dataset. In this way, a fine-tuning dataset is generated that has a common or a same feedback format.

One example of a framework that can be implemented by unified fine-tuning dataset generator 224 is provided as follows. Initially, assume a primary fine-tuning dataset that is a fine-tuning dataset having a target feedback format is given as a dataset D of prompts with two responses using binary preference:

$$\mathcal{D}^* = \{(P_i, A_{i,0}, A_{i,1}, y_i)\}_{i=1}^{M}$$

wherein P is the prompt, $A_{i,0}$ and $A_{i,1}$ are responses, or answers, to the prompt, with $A_{i,0}$ being the preferred response to the prompt. The feedback label $y_i$ indicates the binary feedback indicating the preferred response. As an example, assume prompt $P_i$ is "... dropped the bag, because the was heavier." In such a case, $A_{i,0}$=box and $A_{i,1}$="bag." In this regard, $A_{i,0}$ is the preferred response to the prompt. This type of dataset takes the form of binary preference with two example responses corresponding to a single prompt. With the binary format, examples generally do include an indication of quality, as feedback only indicates a preference of one response over another response.

Further assume a secondary fine-tuning dataset is given as a dataset D* of prompts and responses (question-answer tuples):

$$\mathcal{D}^* = \{(P_i, A_i, y_i)\}_{i=1}^N$$

wherein $P_i$ and $A_i$ is the ith prompt and response pair, respectively, and $y_i \in \mathbb{R}^k$ is the real-valued vector denoting the score of various labels for that pair (e.g., toxicity=0.166). For a dataset of this type to be compatible to the binary format, the same prompt includes multiple responses. For example, $(P_i, A_i, y_i) \in \mathcal{D}^*$ can be a second response to the prompt. An example of data in a multi-axis numerical format includes a prompt, a response, and feedback as follows:

$P_i$="Can you write a short introduction about . . . "

$A_i$—"Monopsony refers to a market structure where . . . "

$$y_i = \begin{matrix} \text{quality} \\ \text{toxicity} \\ \text{spam} \\ \vdots \\ \text{not appropriate} \end{matrix} \begin{bmatrix} y_{i,1} \\ y_{i,2} \\ y_{i,3} \\ \vdots \\ y_{i,k} \end{bmatrix}$$

To generate a unified fine-tuning dataset, given dataset D*, a dataset or dictionary is created with prompts as keys and responses as a list of all responses to that prompt. The responses can then be sorted by a relevant axis or attribute of preference, such as toxicity. In some cases, responses that vary most in terms of preference as a measure of quality can be selected (e.g., the top 20%, 40%, etc.). Prompts can be clustered to ensure diverse prompts are selected. For each prompt, the responses with the highest difference in preference can be selected. In accordance with obtaining tuples containing a prompt, preferred response, and non-preferred response, the data is generally in the format of $(P_i, A_{i,0}, A_{i,1})$, which is the same format as D. As such, a unified fine-tuning dataset can be generated by taking the union of the datasets:

$$\mathcal{D}_{train} = D \cup D^*$$

$D_{train}$ represents the unified fine-tuning dataset that can then be used for fine-tuning a language model. This example implementation can be extended to N datasets by merging them into binary preference datasets, the native format of D. In this instance, $D_{train}$ takes the format:

$$D_{train} = \bigcup_{i=1}^N D_i$$

In some embodiments, a labeled dataset may follow a tree structure, in which prompts are followed by a single response. If such a dataset contains multiple responses to the same prompt, the dataset can be modified for use with the framework provided herein. For example, each prompt can be linked with all of its responses and, thereafter, sorted on an axis or attribute of interest (e.g., response quality). This can be completed in O(n) time by having each prompt be a key, adding responses to an array as a value, and taking one pass through the dataset. The resulting dataset may discard the numerical ranking, but preserve the preference of the pair. In some cases, prior to discarding the ranking, examples can be sorted by the difference in score between responses. At this step, each example from the dataset contains the following information: $D_i=(P_i, A_{i,0}, A_{i,1}, y_{i,0}, y_{i,1})$, and the top examples can be selected from this list.

The data filter 226 is generally configured to filter or remove data such that it is not used in fine-tuning a language model. Stated differently, the data filter 226 may select particular data to use for fine-tuning a language model. In this regard, the data filter 226 can select particular data from the unified fine-tuning dataset for use in fine-tuning a language model or to remove from use in fine-tuning a language model. As can be appreciated, when combining different datasets, redundant or similar data may exist. Such data may not be useful, thereby resulting in undesired use of computing resources to perform fine-tuning. As such, prior to performing fine-tuning of a language model, the data filter 226 can identify particular data and remove such data from the dataset such that it is not used for fine-tuning.

Any number of data may be identified and removed. In some cases, data to filter may be selected in a manner so as to increase quality of data, increase diversity of data, and/or reduce redundancy of data used to fine-tune a language model. For example, data to filter may be selected to result in diverse data that covers important concepts, yet limiting redundancy such that data size is reduced.

Filtering data in accordance with quality can be performed in any of a number of ways. In one embodiment, data quality is inferred from numerically-labeled responses to prompts. In some implementations, such data filtering may be performed before datasets are merged into a unified feedback format (e.g., a binary preference format). As one example implementation, assume i is the sample number (e.g., associated with a prompt and response), $S_i$ denotes the score for a sample, and k is the index of the label. In an effort to maximize the difference in score of samples, $y_{i,1}$ is the most preferred response, and $y_{i,2}$ reflects the score of the least preferred response.

$$S_i = \|y_{i,0} - y_{i,1}\|$$

wherein each prompt $P_i$ has a score $S_i$. The prompts can be ranked by difference in scores and, thereafter, the top samples can be selected to examine the importance of example quality relative to count. Additional filters can also be used, such as selecting prompts with responses in the first and third quartiles of preference.

In some cases, a best and worst example are identified and designated as a preferred and not-preferred response to a prompt, respectively. In this regard, such samples are identified as a highest quality pair of responses, as they provide the greatest difference along the axis or attribute of interest. In instances where a prompt has only one associated response, the prompt can be discarded as no comparison between responses is possible.

Filtering data in accordance with diversity can be performed in any of a number of ways. In some cases, data can be filtered for diversity based on clustering prompts. In this regard, embeddings for each prompt can be generated. Embeddings may be generated using, for example, a sentence transformer, such as all-MiniLM-L6-v2. Upon generating embeddings, a clustering algorithm, such as k-Means can be implemented to cluster the embeddings. For each of the clusters $\{c_1, c_2, \ldots\}$, a portion of responses can be selected. For instance, in some cases, a predetermined percent of top responses can be selected. In other cases, a predetermined number of top responses can be selected. In yet other cases, a sampling of responses from clusters may occur.

Filtering data to reduce redundancy can be performed in various ways. For example, identifying redundant or similar prompts may be performed. In accordance with identifying redundant or similar prompts, one or more of the identified redundant or similar prompts and corresponding data may be removed from the dataset.

Filtering data may be performed before or after a unified fine-tuning dataset is generated. When to perform data filtering may depend on the data used to identify data to filter. For example, in cases in which feedback data is used to identify data to filter, such data filtering may be performed prior to converting the feedback data from one format to another format.

The language model fine tuner 226 is generally configured to fine-tune a language model using the unified fine-tuning dataset or filtered dataset associated therewith (also referred to as a refined unified fine-tuning dataset). In this regard, a pre-trained language model 206 is obtained and fine-tuned via language model fine tuner 226. The pre-trained language model can be any type of language model and can perform any type of task. In some embodiments, the language model is a large language model trained on an immense amount of data to learn billions of parameters during training.

The language model fine tuner 226 can fine-tune a pre-trained language model in any number of ways, and the approach implemented to perform fine-tuning is not intended to be limited herein. One example approach for fine-tuning is supervised fine-tuning (SFT) using a unified fine-tuning dataset, or a refined unified fine-tuning dataset. In this way, SFT uses a supervised dataset of high-quality language model outputs. Using this approach, a pre-trained language model can be directly fine-tuned using such a unified fine-tuning dataset. In fine-tuning, the model learns to replicate the style of the samples included in the dataset. SFT can use next-token prediction as its underlying training objective.

Another example approach for fine-tuning is reinforcement learning from human feedback (RLHF). RLHF uses reinforcement learning to directly optimize a language model with human feedback. In this way, RLHF enables language models to align a model trained on a general corpus of text data to that of human preferences. In RLHF, a multi-step training approach is used. The training process begins with a pre-trained language model, which is then fine-tuned using supervision (via SFT). The fine-tuned model is then used to initialize a reward model. In this way, a reward model is trained with direct human feedback, which is then used to optimize performance of the language model through reinforcement learning. In some embodiments, RLHF is performed in association with Proximal Policy Optimization (PPO). Variations of these approaches, as well as other approaches, may be used for fine-tuning a language model, in accordance with embodiments described herein.

In accordance with performing fine-tuning, the fine-tuned language model 240 is output or provided for subsequent use. In this way, the fine-tuned language model 240 may be used to perform various functionalities. The fine-tuned language model 240 may be used to perform various types of tasks, such as speech recognition, machine translation, natural language generation, information retrieval, etc. In operation, a fine-tuned language model 240 may take, as input, a prompt generated by a user (e.g., via a user device) and provide, as output, a response (e.g., to the user device). Advantageously, the fine-tuned language model 240 is fine-tuned in a way that enables or promotes generating a desired response for the user, as the fine-tuned language model 240 is fine-tuned in accordance with a dataset including desired human feedback. Importantly, as the dataset used to fine-tune the language model can incorporate various feedback formats, more diversity and relevance to the data may be obtained, thereby providing a more accurate, relevant, or desired response.

Figure 3:
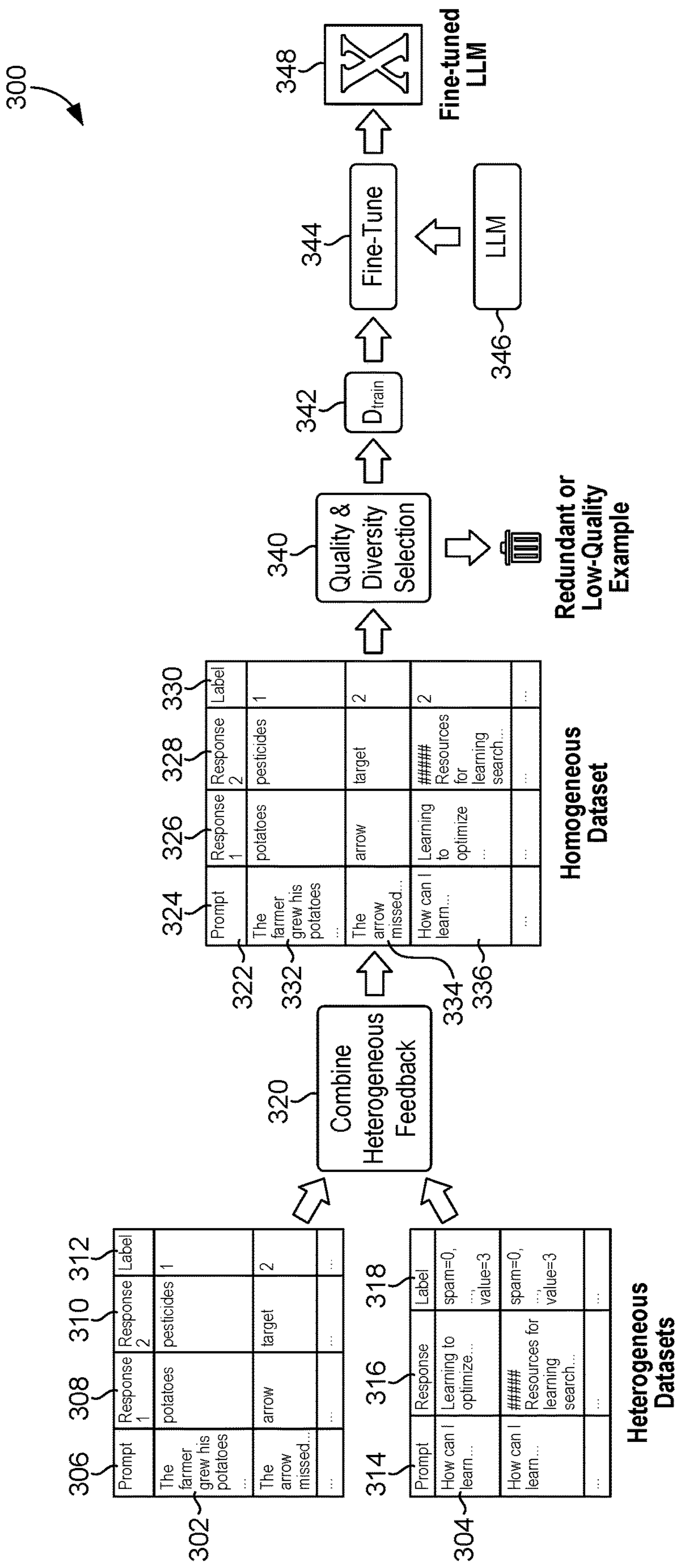
FIG. 3 provides an example diagram of generating a unified fine-tuning dataset and using the unified fine-tuning dataset to fine-tune a language model, in accordance with embodiments of the present disclosure.

Turning now to FIG. 3, FIG. 3 provides one example implementation, in accordance with embodiments described herein. In FIG. 3, a first labeled dataset 302 and a second labeled dataset 304 are obtained. As shown, the labeled datasets include different feedback formats. In this example, the first labeled dataset 302 is in a binary format. In this example, the first labeled dataset includes a prompt column 306, a first response column 308, a second response column 310, and a feedback label 312. For example, for a first sample, a prompt is "The farmer grew his potatoes . . . " The first response is "potatoes," and the second response is "pesticides." The label is "1," indicating the human preferred the first response of "potatoes" for the corresponding prompt. The second labeled dataset 304 is in a multi-axis numerical format. In this example, the second labeled dataset 304 includes a prompt column 314, a response column 316, and a feedback label column 318. For example, for a first sample, a prompt is "How can I learn . . . " The response is "Learning to optimize . . . " In this example, multiple labels are provided. For example, a feedback label of "0" relates to spam associated with the response, and a feedback label of "1" relates to a value of the response.

At block 320, the heterogeneous labeled datasets are converted to a unified feedback format and combined to generate a unified fine-tuning dataset 322. In this example, assume the binary feedback format is identified as the target feedback format. In such a case, the labeled dataset 304 is converted to a form that includes binary feedback to generate the unified fine-tuning dataset 322. The unified fine-tuning dataset includes a prompt column 324, a first response column 326, a second response column 328, and a feedback label column 330. As shown, samples 332 and 334 correspond with the samples in the first labeled dataset 302, as such data is already in the target feedback binary format. By comparison, sample 336 is a converted sample from the data in the second labeled dataset 304. In particular, the different responses as different samples in the second labeled dataset 304 are converted to a single sample in accordance with a prompt, a first response, and a second response, as shown in sample 336. Further, a feedback label is included that indicates a preference for one of the responses, which in this case is a preference for response 2 of "####Resources for learning search . . . " As described herein, the preferred response can be selected in any number of ways. For example, the feedback aggregate, feedback average, or feedback associated with a particular attribute (e.g., value) may be used to select which response is preferred. Based on converting the second labeled dataset 304, the labeled dataset 322 includes unified or similarly formatted data.

At block 340, the unified fine-tuning dataset 322 is analyzed to filter the data. In this regard, the dataset is analyzed in relation to quality and diversity of samples (e.g., entries of prompt-responses) to remove low-quality or redundant examples, resulting in a refined unified fine-tuning dataset 342. The refined unified fine-tuning dataset 342 is then used to fine-tune, at block 344, the pre-trained language model 346. As can be appreciated, any type of fine-tuning may be implemented. For example, SFT and/or RLHF may be employed to fine-tune the pre-trained language model 346 using the refined unified fine-tuning dataset 342. Based on the fine-tuning, the fine-tuned language model 348 is generated. The fine-tuned language model 348 can subsequently be used to perform any number or type of language model tasks. In this regard, the fine-tuned language model 348 may obtain, as input, a prompt, and based on the prompt, provide a response as output. Advantageously, utilizing heterogeneous data as a basis for fine-tuning the language model enables a more desired response to be generated via the fine-tuned language model 348.

Figure 4:
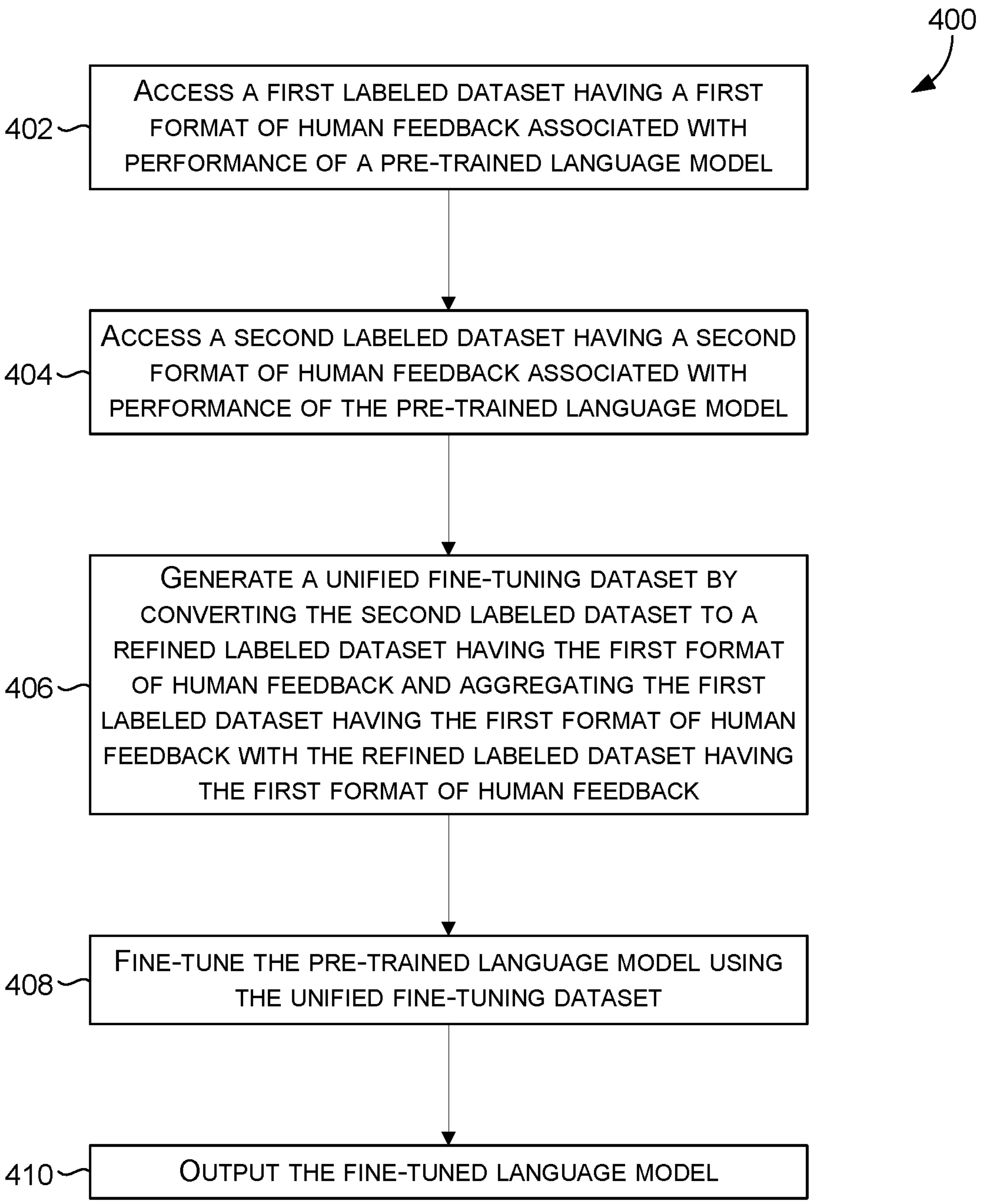
FIG. 4 is a process flow showing a method for facilitating generation and utilization of a unified fine-tuning dataset, in accordance with embodiments of the present disclosure.
Figure 5:
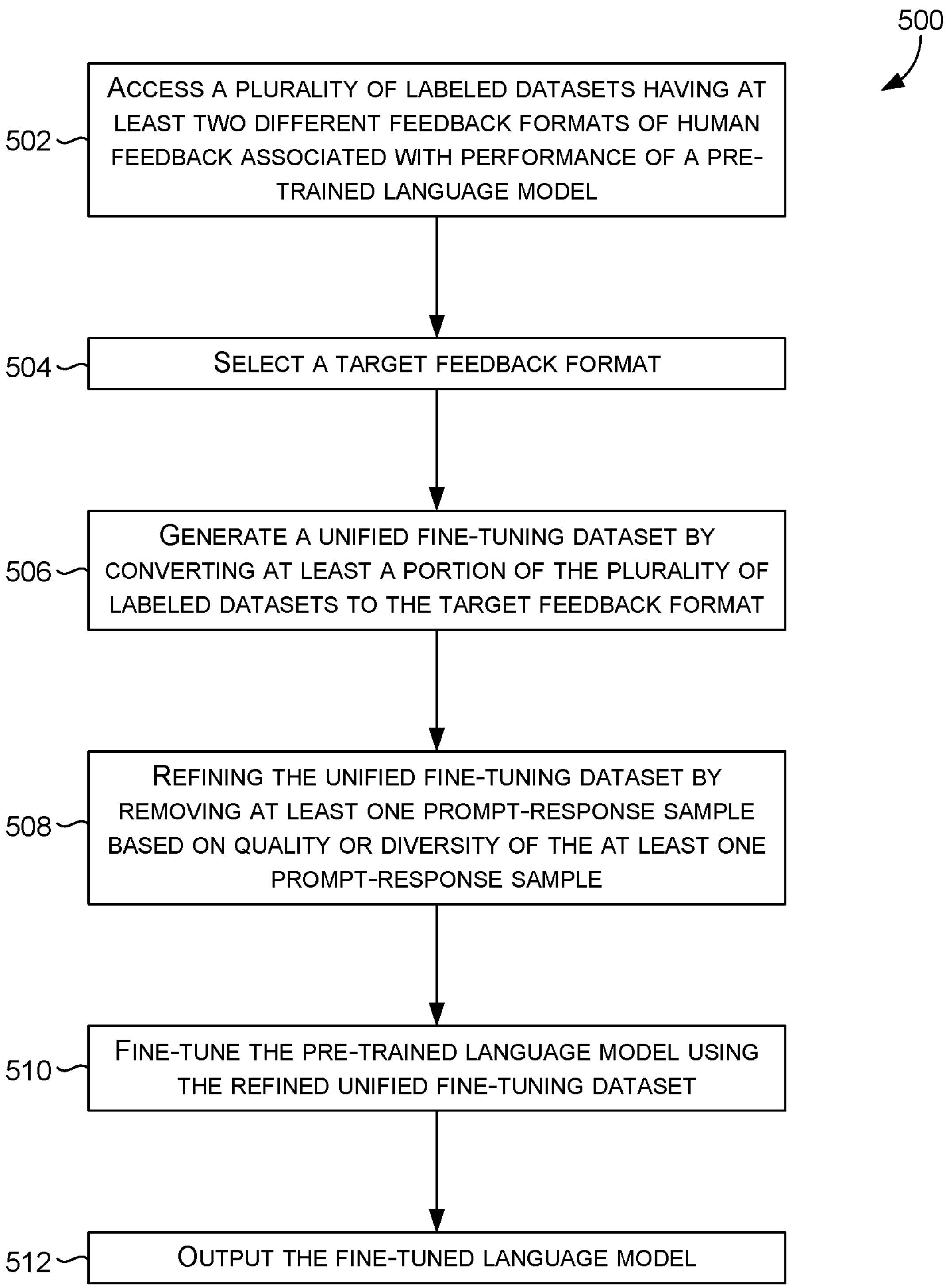
FIG. 5 is a process flow showing another method for facilitating generation and utilization of a unified fine-tuning dataset, in accordance with embodiments of the present disclosure.
Figure 6:
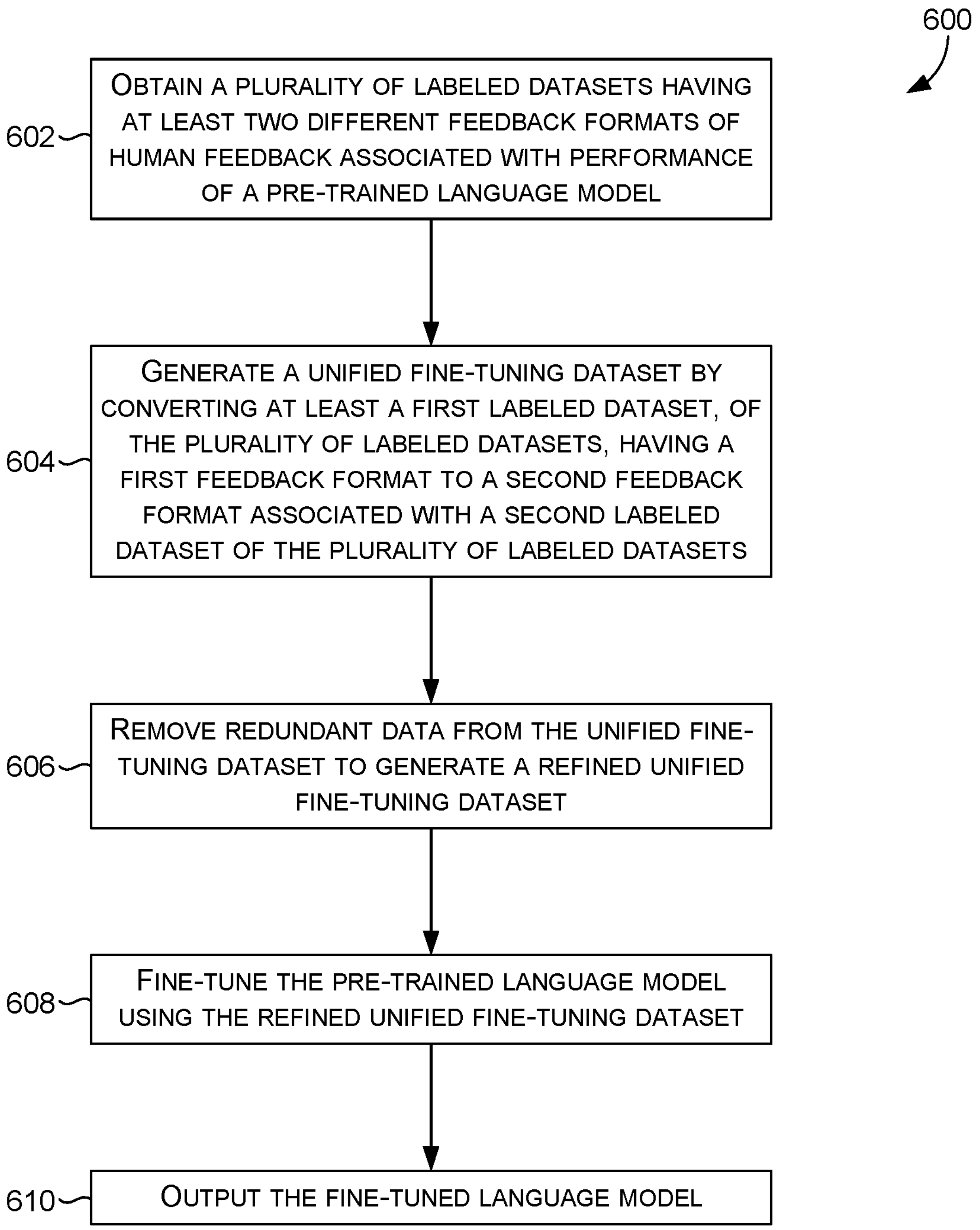
FIG. 6 is a process flow showing another method for facilitating generation and utilization of a unified fine-tuning dataset, in accordance with embodiments of the present disclosure.

Exemplary Implementation of Facilitating Generation and Utilization of Unified Fine-Tuning Datasets With reference now to FIGS. 4-6, FIGS. 4-6 provide method flows related to facilitating generation and utilization of unified fine-tuning datasets, in accordance with embodiments of the present technology. Each block of method 400, 500, and 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-6 are exemplary only and not intended to be limiting. As can be appreciated, in some embodiments, method flows 400-600 can be implemented, at least in part, to facilitate effectively and efficiently fine-tuning a language model.

Turning initially to FIG. 4, a flow diagram is provided showing an embodiment of a method 400 for facilitating generation and utilization of a unified fine-tuning dataset, in accordance with embodiments described herein. Such a unified fine-tuning dataset can be used to efficiently and effectively fine-tune a language model, such as a large language model.

Initially, at block 402, a first labeled dataset having a first format of human feedback associated with performance of a pre-trained language model is accessed. In embodiments, the pre-trained model is a large language model. At block 404, a second labeled dataset having a second format of human feedback associated with performance of the pre-trained language model is accessed. In embodiments, the first format of human feedback is one of a binary format, a numerical format, or a multi-axis format, and the second format of human feedback is a different one of the binary format, numerical format, and multi-axis numerical format, thereby resulting in heterogeneous datasets. The first labeled datasets and/or second labeled datasets can include human feedback provided by one or more feedback providers indicating interest or preference associated with corresponding responses in the datasets. Such labeled datasets may include a set of prompts, a set of responses corresponding with the responses, and a set of feedback indicating the performance of the model in relation to the set of responses. In some embodiments, the labeled datasets are obtained from different data sources. In some cases, the first format of human feedback is a binary format indicating a preference of a first response compared to a second response associated with a prompt. In such a case, the second labeled dataset can be converted to the binary format. At block 406, a unified fine-tuning dataset is generated by converting the second labeled dataset to a refined labeled dataset having the first format of human feedback and aggregating the first labeled dataset having the first format of human feedback with the refined labeled dataset having the first format of human feedback. At block 408, the pre-trained language model is fine-tuned using the unified fine-tuning dataset. In embodiments, the pre-trained language model is fine-tuned using supervised fine-tuning or reinforcement learning fine-tuning to align the pre-trained language model with human preferences. At block 410, the fine-tuned language model is output. In this regard, the fine-tuned language model can be used to perform tasks, for example, in response to an input prompt.

Turning now to FIG. 5, a flow diagram is provided showing an embodiment of a method 500 for facilitating generation and utilization of a unified fine-tuning dataset, in accordance with embodiments described herein. Such a unified fine-tuning dataset can be used to efficiently and effectively fine-tune a language model, such as a large language model.

Initially, at block 502, a plurality of labeled datasets having at least two different feedback formats of human feedback associated with performance of a pre-trained language model is accessed. In embodiments, the at least two different feedback formats of human feedback can be a binary format, a numerical format, and a multi-axis numerical format. At block 504, a target feedback format is selected. In embodiments, the target feedback format is a feedback format that corresponds with a feedback format used in one of the labeled datasets. The target feedback format may be selected in any of a number of ways. As one example, the target feedback format may be automatically selected based on a most simplistic feedback format. At block 506, a unified fine-tuning dataset is generated by converting at least a portion of the plurality of labeled datasets to the target feedback format. As one example, assume the target feedback format is a binary format. In such a case, the first labeled dataset having a numerical format can be converted to the binary format by selecting a first response to a prompt having a greater feedback value as a preferred response as compared to a second response to the prompt having a lower feedback value. At block 508, the unified fine-tuning dataset is refined by removing at least one prompt-response sample based on quality or diversity of the at least one prompt-response sample. In embodiments, the quality is inferred using a numerically-labeled feedback in association with a prompt-response sample(s). Diversity may be identified using prompt clustering. At block 510, the pre-trained language model is fine-tuned using the refined unified fine-tuning dataset. At block 512, the fine-tuned language model is output. In this regard, the fine-tuned language model can be used to perform a language model task(s).

Turning now to FIG. 6, a flow diagram is provided showing an embodiment of a method 600 for facilitating generation and utilization of a unified fine-tuning dataset, in accordance with embodiments described herein. Such a unified fine-tuning dataset can be used to efficiently and effectively fine-tune a language model, such as a large language model.

Initially, at block 602, a plurality of labeled datasets having at least two different feedback formats of human feedback associated with performance of a pre-trained language model is obtained. In embodiments, low-quality samples may be removed from the plurality of labeled datasets. Such low-quality samples can be inferred or identified from numerical feedback associated with responses to prompts. In some cases, low-quality samples are removed before generating the unified fine-tuning dataset. In other cases, low-quality samples are removed after generating the unified fine-tuning dataset. At block 604, a unified fine-tuning dataset is generated by converting at least a first labeled dataset, of the plurality of labeled datasets, having a first feedback format to a second feedback format associated with a second labeled dataset of the plurality of labeled datasets. At block 606, redundant data is removed from the unified fine-tuning dataset to generate a refined unified fine-tuning dataset. In embodiments, redundant data is identified using a clustering of prompts. At block 608, the pre-trained language model is fine-tuned using the refined unified fine-tuning dataset. At block 610, the fine-tuned language model is output. For example, to use the fine-tuned language model, a prompt can be input to the fine-tuned language model that aligns the pre-trained language model with human feedback and, thereafter, outputs from the fine-tuned language model can be obtained in response to the prompt.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
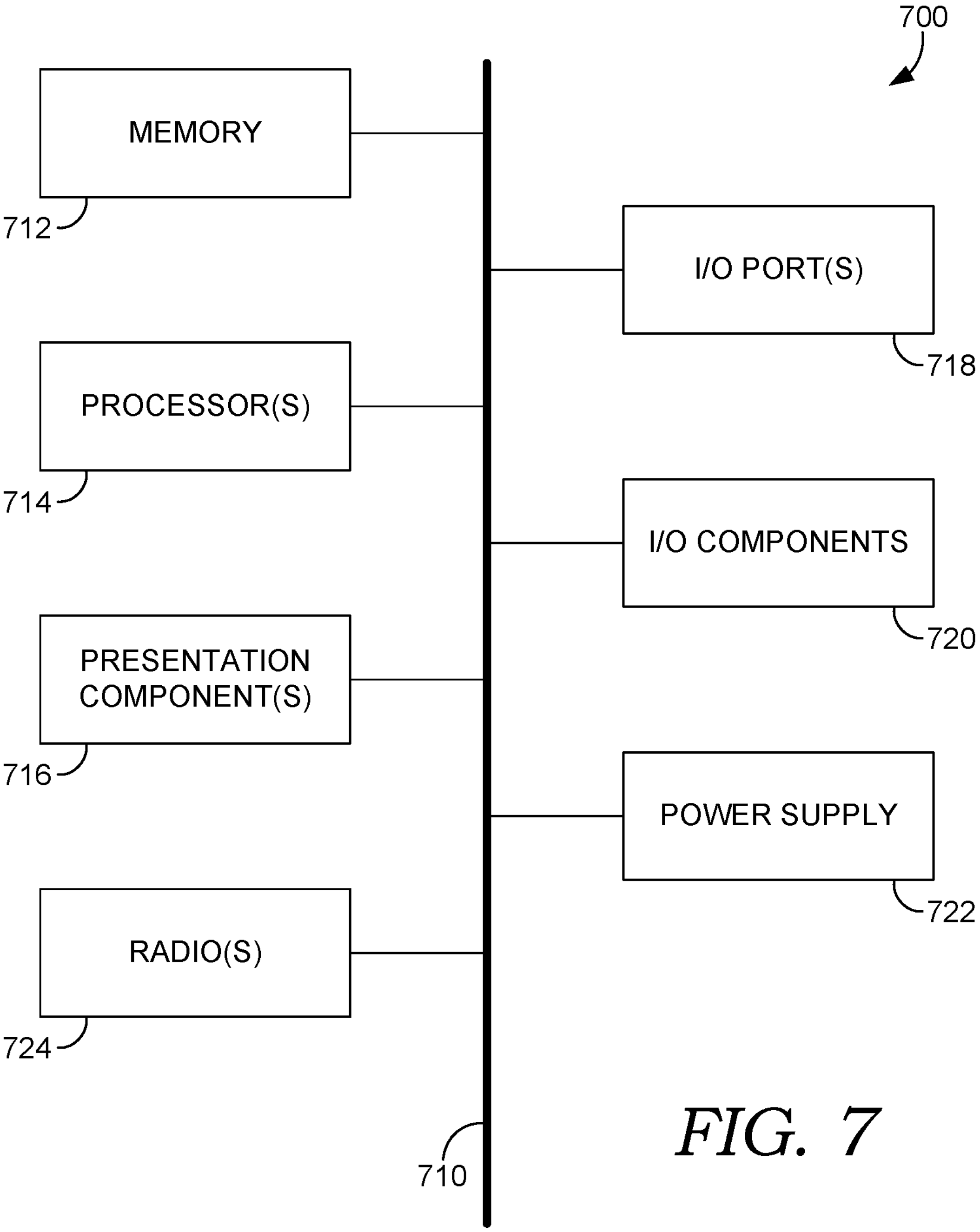
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

The invention claimed is:

1. A non-transitory computer-readable medium storing executable instructions, which when executed by a processing device, cause the processing device to perform operations comprising:

accessing a first labeled dataset having a first format of human feedback associated with performance of a pre-trained language model, wherein the first format of human feedback comprises one of a binary format, a numerical format, or a multi-axis numerical format;

accessing a second labeled dataset having a second format of human feedback associated with performance of the pre-trained language model, wherein the second format of human feedback comprises one of the numerical format or the multi-axis numerical format that is different from the first format;

generating a unified fine-tuning dataset by converting the second labeled dataset in the numerical format or the multi-axis numerical format to a refined labeled dataset having the first format of human feedback that is different from the second format and aggregating the first labeled dataset having the first format of human feedback with the refined labeled dataset having the first format of human feedback;

refining the unified fine-tuning dataset by removing at least one prompt-response sample based on quality or diversity of the at least one prompt-response sample, wherein the quality of the at least one prompt-response sample is inferred using a numerically-labeled feedback in association with the at least one prompt-response sample;

fine-tuning the pre-trained language model using the refined unified fine-tuning dataset or the unified fine-tuning dataset including the first labeled dataset having the first format of human feedback with the refined labeled dataset having the first format of human feedback; and outputting the fine-tuned language model.

2. The media of claim 1, wherein the first format of human feedback comprises the binary format, and the second format of human feedback comprises the numerical format.

3. The media of claim 1 further comprising obtaining the first labeled dataset, wherein the human feedback in the first format is provided by a feedback provider indicating interest or preference associated with corresponding responses.

4. The media of claim 1, wherein the first labeled dataset comprises a set of prompts, a set of responses corresponding with the prompts, and a set of feedback indicating the performance of the pre-trained language model in relation to the set of responses.

5. The media of claim 1, wherein the pre-trained language model comprises a large language model.

6. The media of claim 1, wherein the first labeled dataset is obtained from a first data source, and the second labeled dataset is obtained from a second data source.

7. The media of claim 1, wherein the first format of human feedback comprises the binary format indicating a preference of a first response compared to a second response associated with a prompt, and wherein the second labeled dataset is converted to the binary format.

8. The media of claim 1, wherein the pre-trained language model is fine-tuned using supervised fine-tuning or reinforcement learning fine-tuning to align the pre-trained language model with human preferences.

9. The media of claim 1 further comprising using the fine-tuned language model to perform a task.

10. A computer-implemented method comprising:

accessing a first labeled dataset having a first format of human feedback associated with performance of a pre-trained language model, wherein the first format of human feedback comprises one of a binary format, a numerical format, or a multi-axis numerical format;

accessing a second labeled dataset having a second format of human feedback associated with performance of the pre-trained language model, wherein the second format of human feedback comprises one of the numerical format or the multi-axis numerical format that is different from the first format;

generating a unified fine-tuning dataset by converting the second labeled dataset to a refined labeled dataset having the first format of human feedback and aggregating the first labeled dataset having the first format of human feedback with the refined labeled dataset having the first format of human feedback;

refining the unified fine-tuning dataset by removing at least one prompt-response sample based on quality or diversity of the at least one prompt-response sample, wherein the diversity of the at least one prompt-response sample is identified using prompt clustering;

fine-tuning the pre-trained language model using the refined unified fine-tuning dataset or the unified fine-tuning dataset including the first labeled dataset having the first format of human feedback with the refined labeled dataset having the first format of human feedback; and outputting the fine-tuned language model.

11. The computer-implemented method of claim 10, wherein the first format of human feedback comprises the binary format, and the second format of human feedback comprises the numerical format.

12. The computer-implemented method of claim 10, wherein the first format of human feedback comprises the binary format indicating a preference of a first response compared to a second response associated with a prompt, and wherein the second labeled dataset is converted to the binary format.

13. The computer-implemented method of claim 10, wherein the first format comprises a binary format, and wherein the second labeled dataset comprising the numerical format is converted to the binary format by selecting a first response to a prompt having a greater feedback value as a preferred response as compared to a second response to the prompt having a lower feedback value.

14. The computer-implemented method of claim 10, wherein the quality of the at least one prompt-response sample is inferred using a numerically-labeled feedback in association with the at least one prompt-response sample.

15. A computing system comprising:

a processor; and a non-transitory computer-readable medium having stored thereon instructions that when executed by the processor, cause the processor to perform operations including:

accessing a first labeled dataset having a first format of human feedback associated with performance of a pre-trained language model, wherein the first format of human feedback comprises one of a binary format, a numerical format, or a multi-axis numerical format;

accessing a second labeled dataset having a second format of human feedback associated with performance of the pre-trained language model, wherein the second format of human feedback comprises one of the numerical format or the multi-axis numerical format that is different from the first format;

generating a unified fine-tuning dataset by:

removing low-quality samples from the first labeled dataset or the second labeled dataset, wherein the low-quality samples are inferred from numerical feedback associated with responses to prompts, converting the second labeled dataset to a refined labeled dataset having the first format of human feedback, and aggregating the first labeled dataset having the first format of human feedback with the refined labeled dataset having the first format of human feedback;

fine-tuning the pre-trained language model using the unified fine-tuning dataset including the first labeled dataset having the first format of human feedback with the refined labeled dataset having the first format of human feedback; and outputting the fine-tuned language model.

16. The system of claim 15 further comprising removing redundant data from the unified fine-tuning dataset, wherein the redundant data is identified using clustering of prompts.

17. The system of claim 15 further comprising:

obtaining a prompt;

providing the prompt as input to the fine-tuned language model that aligns the pre-trained language model with human feedback; and obtaining, as output from the fine-tuned language model, a response to the prompt.

* * * * *